US010664757B2

(12) United States Patent
Lastras-Montano et al.

(10) Patent No.: US 10,664,757 B2
(45) Date of Patent: May 26, 2020

(54) COGNITIVE OPERATIONS BASED ON EMPIRICALLY CONSTRUCTED KNOWLEDGE GRAPHS

(71) Applicant: International Business Machines Corporation, Armonk, NY (US)

(72) Inventors: Luis A. Lastras-Montano, Cortlandt Manor, NY (US); Vinith Misra, Sunnyvale, CA (US); Livio B. Soares, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 14/855,461

(22) Filed: Sep. 16, 2015

(65) Prior Publication Data
US 2017/0076206 A1    Mar. 16, 2017

(51) Int. Cl.
| G06F 17/28 | (2006.01) |
| G06F 16/90 | (2019.01) |
| G06F 16/33 | (2019.01) |
| G06N 5/02 | (2006.01) |
| G06F 16/332 | (2019.01) |
| G06F 16/901 | (2019.01) |

(52) U.S. Cl.
CPC ......... *G06N 5/022* (2013.01); *G06F 16/3329* (2019.01); *G06F 16/3344* (2019.01); *G06F 16/9024* (2019.01)

(58) Field of Classification Search
CPC . G06N 5/022; G06F 16/3329; G06F 16/3344; G06F 16/9024

USPC ....................................................... 706/1–62
See application file for complete search history.

(56) References Cited

U.S. PATENT DOCUMENTS

| 6,480,991 | B1 * | 11/2002 | Cho | ................... | G06F 17/5072 716/122 |
| 2004/0013305 | A1 * | 1/2004 | Brandt | .................. | G06K 9/342 382/224 |

(Continued)

OTHER PUBLICATIONS

High, Rob, "The Era of Cognitive Systems: An Inside Look at IBM Watson and How it Works", IBM Corporation, Redbooks, Dec. 12, 2012, 16 pages.

(Continued)

*Primary Examiner* — Brandon S Cole
(74) *Attorney, Agent, or Firm* — Stephen J. Walder, Jr.; Ingrid M. Foerster

(57) ABSTRACT

Mechanisms are provided for performing a cognitive operation. The mechanisms receive an original graph data structure comprising nodes and edges between nodes and activity log information for nodes of the original graph data structure. The mechanisms identify a set of nodes in the original graph data structure having a predetermined pattern of activity in the activity log information, and a set of edges between these nodes. The mechanisms calculate an importance weight for each edge in the set of edges and modify the original graph data structure based on the calculated importance weights for the edges in the set of edges, to thereby generate a modified graph data structure. The mechanisms then perform a cognitive operation based on the modified graph data structure. The set of edges may comprise actual edges between the nodes and/or potential edges between the nodes.

18 Claims, 6 Drawing Sheets

(56) References Cited

U.S. PATENT DOCUMENTS

| | | | |
|---|---|---|---|
| 2007/0209075 A1* | 9/2007 | Coffman | H04L 63/14 726/23 |
| 2009/0287678 A1 | 11/2009 | Brown et al. | |
| 2010/0042397 A1* | 2/2010 | Masugata | G06F 16/9024 704/2 |
| 2011/0066587 A1 | 3/2011 | Ferrucci et al. | |
| 2011/0125734 A1 | 5/2011 | Duboue et al. | |
| 2011/0145261 A1* | 6/2011 | Jamjoom | G06F 16/9024 707/748 |
| 2011/0145262 A1* | 6/2011 | Jamjoom | G06F 16/9024 707/748 |
| 2012/0324027 A1 | 12/2012 | Vaynblat et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0297632 A1* | 11/2013 | Cohen | G06F 16/9024 707/758 |
| 2014/0214936 A1* | 7/2014 | Abraham | H04W 4/21 709/204 |
| 2014/0344230 A1 | 11/2014 | Krause et al. | |
| 2015/0046566 A1 | 2/2015 | Vaynblat et al. | |
| 2015/0186528 A1* | 7/2015 | Rao | G06F 16/9535 707/710 |
| 2017/0076206 A1* | 3/2017 | Lastras-Montano | G06F 16/3344 |

OTHER PUBLICATIONS

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

"TRIGONOMETRY" ACTIVITY        "MYSQL" ACTIVITY

"ROGER FEDERER" ACTIVITY

"RAFEL NADAL" ACTIVITY

"GERMANY" ACTIVITY

COGNITIVE OPERATIONS BASED ON EMPIRICALLY CONSTRUCTED KNOWLEDGE GRAPHS

BACKGROUND

The present application relates generally to an improved data processing apparatus and method and more specifically to mechanisms for performing a cognitive operation based on an empirically constructed knowledge graph.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating cognitive systems to perform cognitive functions that attempt to replicate human thinking and fill in the information gaps. One example of such a cognitive system is a Question and Answer (QA) system which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system, is provided for performing a cognitive operation. The method comprises receiving, by the data processing system, an original graph data structure comprising nodes and edges between nodes and activity log information for nodes of the original graph data structure. The method further comprises identifying, by the data processing system, a set of nodes in the original graph data structure having a predetermined pattern of activity in the activity log information, and a set of edges between these nodes. The method also comprises calculating, by the data processing system, an importance weight for each edge in the set of edges and modifying the original graph data structure based on the calculated importance weights for the edges in the set of edges, to thereby generate a modified graph data structure. In addition, the method comprises performing, by the data processing system, a cognitive operation based on the modified graph data structure. The set of edges may comprise actual edges between the nodes and/or potential edges between the nodes.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
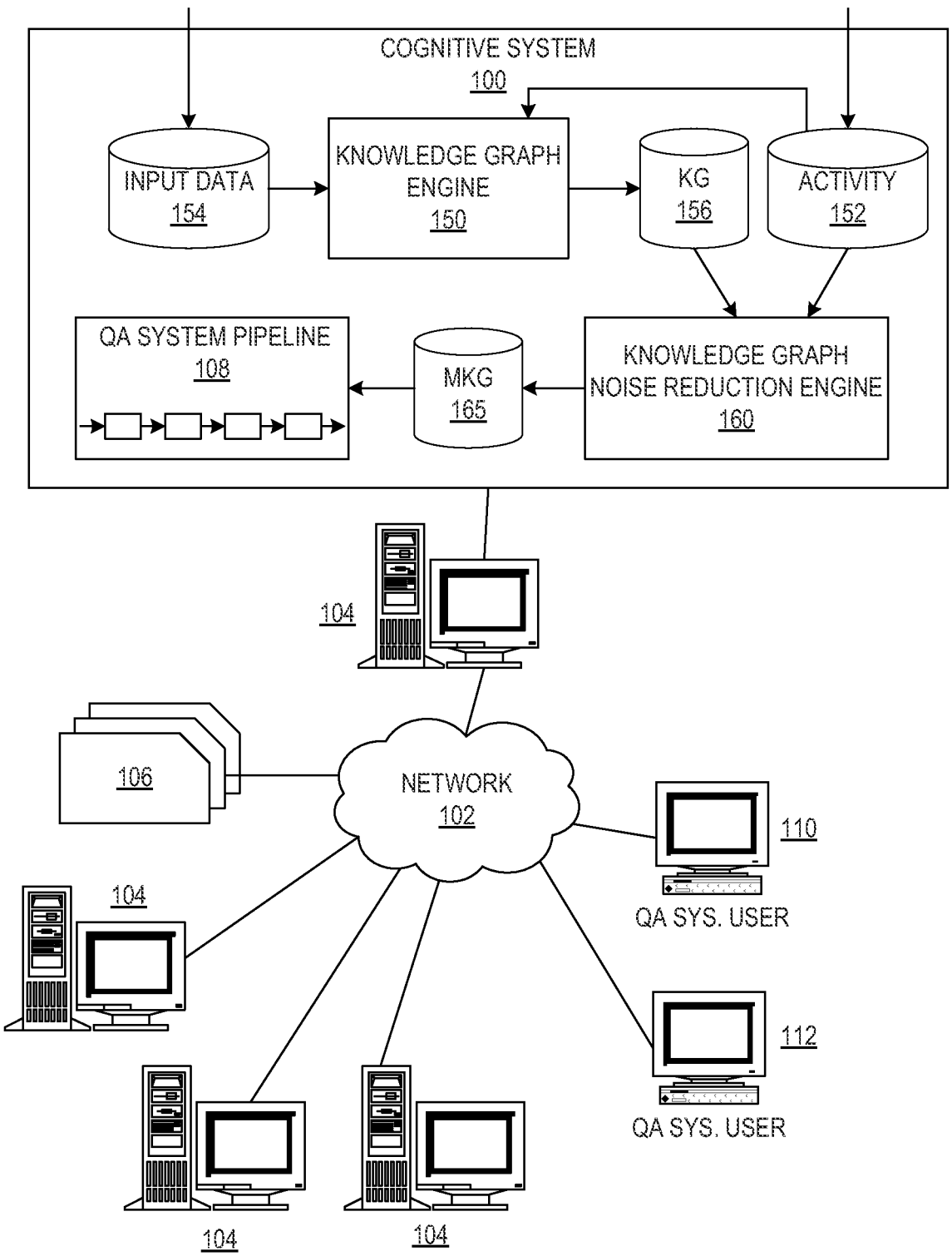
FIG. 1 depicts a schematic diagram of one illustrative embodiment of a question/answer creation (QA) system in a computer network.

The illustrative embodiments provide mechanisms for performing a cognitive operation based on an empirically constructed knowledge graph and mechanisms for removing noise from such an empirically constructed knowledge graph. Many cognitive systems operate based on graphs of objects, where the graphs comprise nodes representing the objects and their attributes, and edges between the nodes represent connections, relationships, or other associations between the objects. The objects themselves may be any entity for which connections, relationships, or associations with other objects is to be modeled by the graph. Thus, for example, objects may represent persons, places, things, events, concepts, etc. These objects have associated attributes which define the objects themselves. The attributes may be of many different types depending upon the particular object. For example, a person object may have attributes comprising the person's name, address, age, gender, links to friends, social network website account information, etc.

The graphs of such objects, referred to herein as "knowledge graphs," may be generated in many different ways depending upon the particular implementation. For example, in knowledge bases, such as Wikipedia™, Freebase™, or other Internet based knowledge base, the links between web pages or portions of content in the knowledge base with other web pages or portions of content in the knowledge base, such as via hyperlinks or other embedded links in the web pages or portions of content, may be analyzed to generate a graph. In such a knowledge graph, the nodes may represent the web pages or portions of content and the edges may represent the linkages (e.g., hyperlinks) between the web pages or portions of content. In a social networking environment, the knowledge graph may be generated by analyzing user accounts and the links between users, such as "friends" lists, colleague lists, or the like, with the nodes of the knowledge graph representing the various users and the linkages, or edges, representing the social connections between these users.

In many such knowledge graphs, the edges between nodes are given weights based on how often the particular edge is traversed. For example, in a knowledge graph representing connections of web pages (or simply "pages"), an edge weight of an edge connecting two nodes representing web pages may be set based on a determination as to how often a user traverses the path from web page A to web page B by clicking on a link in web page A that goes to web page B. One example of such a knowledge graph mechanism is the PageRank algorithm used by the Google™ search engine. PageRank is an algorithm that ranks websites in the Google™ search engine results by counting the number and quality of links to a page to determine a rough estimate of how important the website is, based on the assumption that more important websites are likely to receive more links from other websites.

The original PageRank algorithm reflects the so-called "random surfer model," meaning that the PageRank of a particular page is derived from the theoretical probability of visiting that page when clicking on links at random. A page ranking model that reflects the weight of a web page as a function of how many times real users visits the web page is called the "intentional surfer model." The Google™ toolbar sends information to Google™ for every page visited, and thereby provides a basis for computing PageRank based on the "intentional surfer model." The introduction of the "no-follow" attribute by Google™ to combat "Spamdexing" has the side effect that webmasters commonly use it on outgoing links to increase their own PageRank. This causes a loss of actual links for the Web crawlers to follow, thereby making the original PageRank algorithm based on the random surfer model potentially unreliable. Using information about users' browsing habits provided by the Google™ toolbar partly compensates for the loss of information caused by the no-follow attribute. The Search Engine Result Page (SERP) rank of a web page, which determines a page's actual placement in the search results, is based on a combination of the random surfer model (PageRank) and the intentional surfer model (browsing habits) in addition to other factors.

While the intentional surfer model provides a more accurate evaluation of the importance of a web page itself, it is often desirable to determine information about the interactions between web pages, or nodes of a knowledge graph, i.e. information about the traversal of edges that connect the nodes of the knowledge graph, e.g., the interaction with hyperlinks of web pages that connect one web page to another. Unfortunately, often times information about edge traversals is not readily available. That is, available tools may not in fact track or maintain information about actual interactions with links from one object (e.g., web page) to another. To the contrary, activity logs for the nodes (representing objects) of the knowledge graph, e.g., page view counts every hour for each page, may be the only activity information that is available. For example, tools associated with large collections of web pages or databases, e.g., Wikipedia™, Freebase™, or other similar websites, may maintain hourly counts of views of the various web pages themselves. This information may be stored for many days, months, or even years, and may be the basis for historical analysis with regard to the individual web pages themselves, but provides no information regarding the interactions between the web pages, e.g., links between the web pages.

Moreover, even if weights were able to be assigned to edges in a knowledge graph, such as based on activity log information for the edges and/or nodes, as is provided in the present invention and described hereafter, the weight values associated with the nodes and edges in the knowledge graph can be quite noisy due to the analysis performed. By "noisy" what is meant is that the weights may be erroneously determined due to false associations between nodes determined due to the nature of the analysis performed. For example, an instance of an object representing the person "Roger Federer" (a professional tennis player) may have the same number of links to an object representing the country "Germany" (Roger Federer is in fact Swiss, not German) as it does to the an object representing the person "Pete Sampras" (who is another professional tennis player) based on the analysis and the data upon which the analysis is performed. However, it may be determined that the connection to the Germany object is erroneous and thus, introduces noise into the knowledge graph.

Thus, such noise may lead to false positive edge connections between nodes of the knowledge graph. For example, a mechanism that generates a knowledge graph may analyze a corpus of information, e.g., the Wikipedia™ web pages, Freebase™ web pages, or other data source correlating various objects, and determining that "Ernest Hemingway" has a strong relationship with both "C (programming language)" and with "2001 Anthrax Attacks." The source of such false positives may be two solitary links between "Ernest Hemingway" and "Semicolon" and "Ernest Hemingway" and "Anthrax." Such false positive linkages between objects may result in poor or inaccurate performance of a cognitive system as well as potentially embarrassing situations. That is, the noise will degrade the performance and accuracy of various knowledge graph based mechanisms, such as many cognitive system operations, or algorithms. The above example illustrates how noisy connections between "Hemingway" and "semicolon" and between "Hemingway" and "Anthrax" can lead knowledge graph based mechanisms to erroneously associate the C programming language and Hemingway or 2001 Anthrax attacks and Hemingway.

The illustrative embodiments provide mechanisms for mining activity log information for nodes of a knowledge graph for the purpose of removing noise from the knowledge graph and improving node associations in the knowledge graph, such that the resulting cognitive operations performed based on the knowledge graph have improved accuracy. In a general sense, the illustrative embodiments provide a mechanism for trimming edges of the knowledge graph determined to be most likely to be false positive associations between nodes based on analysis of the activity logs of the various nodes of the knowledge graph. To perform such trimming of edges of the knowledge graph, the mechanisms of the illustrative embodiments identify the popular nodes of the knowledge graph, i.e. nodes in the knowledge graph whose activity metrics (e.g., pageview counts) consistently exceeds a threshold level of activity, e.g., are always strictly positive within a given period of time of monitoring the activity, and identify a set of edges or links connecting such popular nodes such that processing of popular node to popular node edges (referred to herein as "popular-to-popular" edges) is performed to identify edges that may be trimmed. These edges may be actual existing edges or potential edges between the nodes. This is done with regard to "popular-to-popular" edges because it has been determined that such edges have the greatest impact on the reduction of noise in the knowledge graph and hence, the precision/performance of knowledge graph based mechanisms and algorithms.

In determining whether a particular popular-to-popular edge can be trimmed from the knowledge graph or should be retained in graph, a correlation threshold is established that balances the desire to remove edges that have a high confidence of being uncorrelated while minimizing the number of valuable edges that are removed, i.e. maximizing the removal of false positives while minimizing the removal of true positives. The correlation threshold is set based on performing empirical evaluations of permutation tests and observing the permuted correlation maximum of the permutation tests. A statistical evaluation of these permuted correlation maximums is generated as the correlation threshold. Thereafter a trimming process is performed based on this correlation threshold.

The trimming process utilizes a distributed processor architecture having multiple computation nodes that process time series of data for nodes of the graph to thereby identify popular nodes and popular-to-popular edges in the graph as well as reconfigure the data into a row configuration. The identified popular-to-poplar edges are then processed in a distributed manner to generate correlation metrics for the popular-to-popular edges. The correlation metrics may then be compared to the correlation threshold such that popular-to-popular edges that have correlation metrics that equal to or lower than the correlation threshold may be removed from the knowledge graph while popular-to-popular edges that have a correlation metric that is higher than the correlation threshold are maintained.

The result is a trimmed knowledge graph in which noisy edges in the knowledge graph having low correlations are removed. The trimmed knowledge graph may then be stored and/or output for use by the cognitive system in performing one or more cognitive operations. For example, in a cognitive system that employs a Question and Answer (QA) pipeline, the trimmed knowledge graph may represent a more accurate association of concepts within a corpus of information and thus, when operations are performed on the graph to identify related concepts when answering a question, the accuracy of the results is improved due to the reduction in incorrect associations in the knowledge graph. In a cognitive system that processes requests for information, such as via a search engine or the like, the cognitive operation may utilize the trimmed knowledge graph to generate a ranked listing of search results, where the particular placement of a web page in the ranked listing may be at least partially determined based on the trimmed knowledge graph and the correlation metrics of the various web pages represented as nodes in the trimmed knowledge graph. In still other cognitive systems, link prediction mechanisms may be utilized based on this trimmed knowledge graph so as to aid discovery operations, e.g., determining that node A and node B are not connected, but the graphical structure around these nodes indicate that they should be connected by an edge. Other cognitive systems may utilize the knowledge graph to perform operations such as explaining reasons for connections between concepts (represented as nodes of the knowledge graph) or documents (collections of concepts) and relating and recommending documents/content to users. Any of a plethora of possible cognitive operations may be performed utilizing the mechanisms of the illustrative embodiments to provide a modified knowledge graph, e.g. a trimmed knowledge graph.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
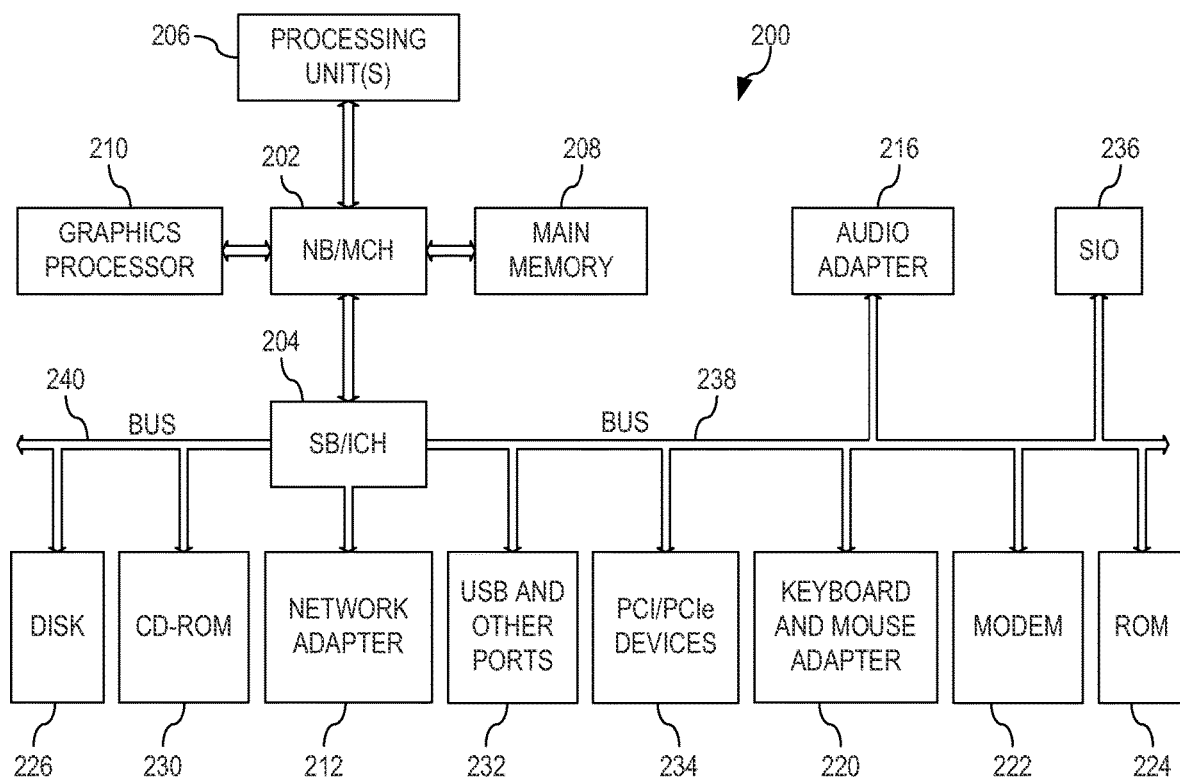
FIG. 2 is a block diagram of an example data processing system in which aspects of the illustrative embodiments are implemented.
Figure 3:
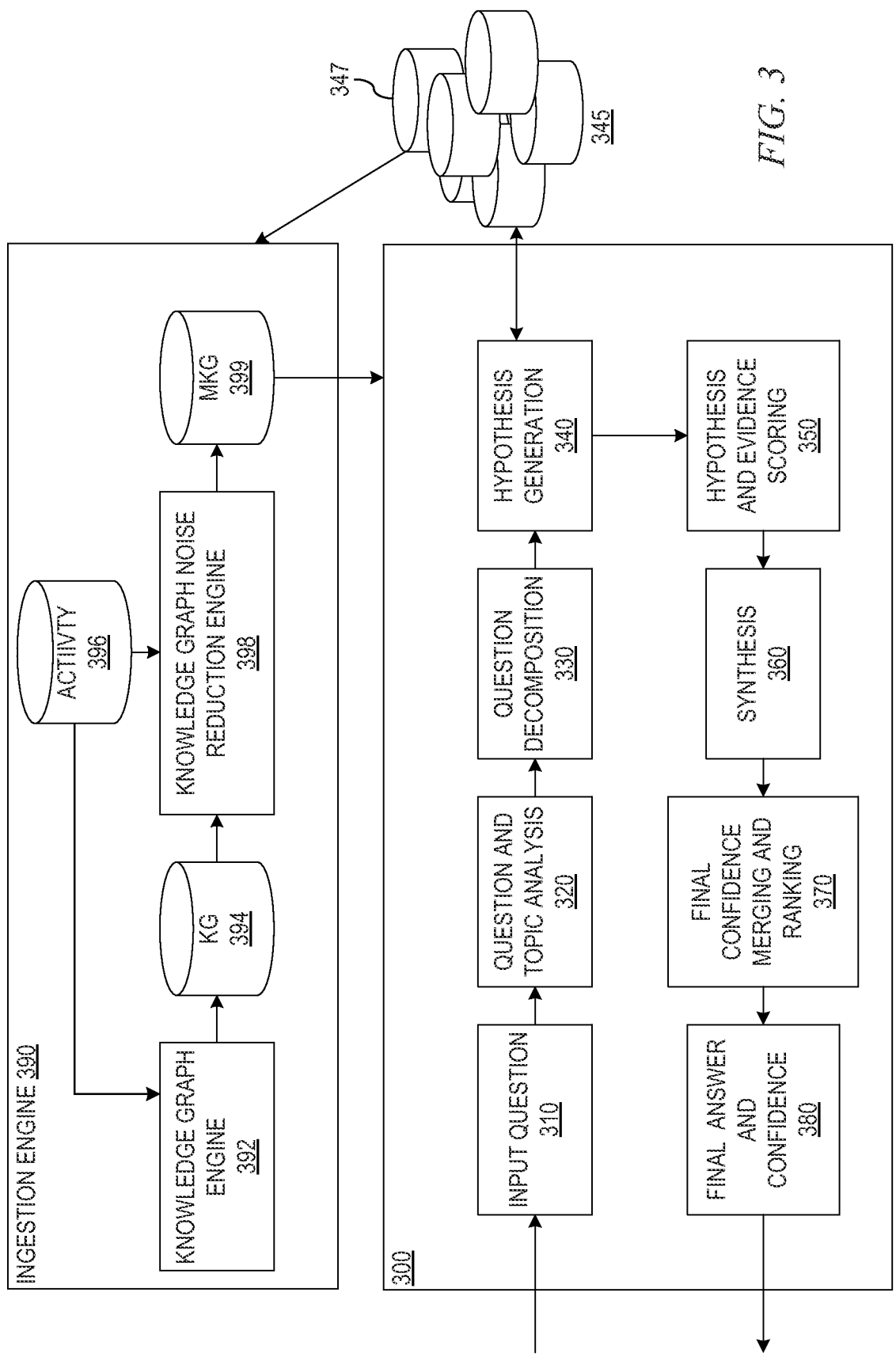
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. It should be appreciated that the QA pipeline based cognitive system is only one example of a cognitive system in which aspects of the illustrative embodiments may be implemented. Other cognitive systems may include search engines, social network analysis systems, or any other system that attempts to analyze relationships between objects or entities so as to glean knowledge from these relationships. In particular, the mechanisms of the illustrative embodiments may be utilized with any cognitive system in which activity associated with objects may be utilized as a mechanism for identifying popular nodes and popular-to-popular edges in a knowledge graph so as to permit trimming of the knowledge graph based on identified correlations to thereby reduce noise in the knowledge graph prior to the cognitive system utilizing the knowledge graph to perform cognitive operations. For purposes of the following description, a process of ingesting a corpus of content, such as web pages or electronic documents, will be described in which the corpus is represented as a knowledge graph which is subjected to the mechanisms of the illustrative embodiments to reduce noise in the resulting trimmed knowledge graph and improve operation of the cognitive system, such as improving the quality of the answers generated to natural language questions based on the trimmed knowledge graph.

Because an example of a cognitive system utilizing a QA pipeline will be described herein, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for generating a knowledge graph, upon which the cognitive system 100 may operate to perform its cognitive operations, such as ingestion of a corpus of information that is utilized by the QA system pipeline 108 of the cognitive system 100. Moreover, the illustrative embodiments comprise logic for implementing a knowledge graph noise reduction engine 160 to reduce noise in the knowledge graph data structure 156 generated by the knowledge graph engine 150. While the knowledge graph engine 150 is shown as part of the cognitive system 100, it should be appreciated that this mechanism may be implemented in another data processing system (not shown) which may provide the knowledge graph (KG) data structure 156 to the cognitive system 100 for processing.

In accordance with the mechanisms of the illustrative embodiments, the knowledge graph engine 150 utilizes objects in a set of input data 154 to generate an initial knowledge graph 156 which is processed, based on information from activity logs 152 that identifies activity associated with the particular objects in the knowledge graph 156, to generate a modified knowledge graph 165. The initial knowledge graph 156 comprises an initial graph of entities, represented by nodes, and their initial determination of interconnectivity between the entities, e.g., known links between the entities. For example, an initial knowledge graph 156 may be created from the definition of web pages and hyperlinks in the web pages of a known website. The activity log 152 information may take many different forms depending upon the particular implementation of the illustrative embodiments. In one illustrative embodiment, the objects in the input data 154 are web pages of one or more websites and the activity logs 152 store data representing the hourly number of views of the various web pages for a particular period of time. To give a more concrete example, the objects in the input data 154 may represent the various web pages for the various topics identified in the Wikipedia™ and/or Freebase™ online encyclopedia websites, and the activity logs 152 may comprise the number of page views of the various web pages of these websites. Thus, both the input data 154 and the activity logs 152 may be obtained from a source outside of the cognitive system 100. The activity log 152 information is utilized by the illustrative embodiments to modify the knowledge graph 156 to generate a modified knowledge graph 165 as discussed hereafter.

The activity logs 152 provide information about the activity associated with the objects themselves, i.e., the nodes, not necessarily the transitions from one node to another, e.g., one web page to another. In other words, the activity logs 152 may record the activity counts and other information regarding the nodes and not necessarily the edges between nodes, e.g., activity may be user, hardware, or software interaction with the object such as a user viewing a web page with a web browser application on a client computer, for example. Thus, when generating the modified knowledge graph data structure 165, the knowledge graph noise reduction engine 160 performs analysis on the activity logs 152 to identify correlations between the activities of the various nodes specified in the knowledge graph 156 which was generated by the knowledge graph engine 150 based on the input data 154. These correlations may be indicative of potential edges between nodes indicating a linkage between the nodes due to similar patterns of activity.

In one illustrative embodiment, this correlation mechanism of the knowledge graph noise reduction engine 160 looks for "events" which indicate possible correlations between activity on different nodes. These "events" are essentially spikes or identifiable increases in activity. For example, if the activity of one node increases at approximately the same time as the activity of another node, a correlation between the nodes may be determined to exist. In another example, if the activity of a first node increases and the activity of another node increases shortly thereafter, and this is done repetitively within the given time period, then a correlation may be determined to exist. Thus, the knowledge graph engine 150 performs various activity "event" pattern analysis to identify correlations between activity of various objects in the activity logs 152 associated with objects in the input data 154. In this way, edges or potential edges between nodes in the knowledge graph 156 may be evaluated to adjust their weights, also referred to as "importance" weights since they represent the importance of the relationship between the nodes of the edge, in accordance with the determined correlations between activity of the various nodes.

Figure 6:
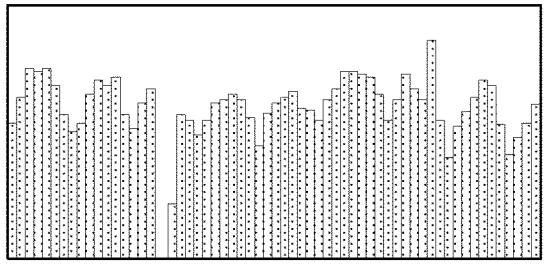
FIG. 6 illustrates example time series bar graphs of daily page views for the web page in the Wikipedia™ online encyclopedia website for concept of "trigonometry" and daily page views for the web page associated with the concept of "MySQL"
Figure 6:
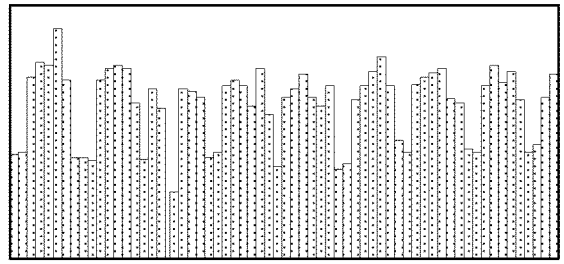

It should be appreciated that in the initial knowledge graph 156, the knowledge graph 156 may comprise noisy edges in that there may be edges, or potential edges, generated by the knowledge graph engine 150 between nodes which do not in fact exist or whose relative importance weights are given values that are skewed due to correlations of activity from the activity logs 152 between nodes which in fact are not correlated. For example, FIG. 6 illustrates example time series bar graphs of daily page views for the web page in the Wikipedia™ online encyclopedia website for concept of "trigonometry" and daily page views for the web page associated with the concept of "MySQL". These concepts are clearly unrelated, however they appear to be highly correlated in the activity data simply because subtends tend to be performing lookup operations for the concept of "trigonometry" during the same days and times that engineers look up the concept "MySQL." Thus, while an edge may exist in the knowledge graph 156, or the importance weight of the edge may be erroneously high, between the nodes representing trigonometry and MySQL, this edge is in fact "noise" in the knowledge graph. Mechanisms of the illustrative embodiments are utilized to trim this knowledge graph 156 so as to reduce the amount of noise in the knowledge graph 156, as discussed hereafter, when generating the modified knowledge graph 165.

The knowledge graph noise reduction engine 160 may model the activity of the nodes, from the activity logs 152, as a Poisson process with time varying activity rates $\lambda_x(t)$. With regard to web pages of web sites, for example, the activity rates may be thought of as page views which are also referred to herein as "arrivals" of viewers to a particular web page and thus, $\lambda_x(t)$ may be considered to be an "arrival rate" of viewers to the web page, which is an object in the input data 154 represented by a node in the knowledge graph data structure 156. For example, on a Friday night the rate at which users arrive at the concept "party" is high and on Saturday morning the arrival rate a the concept of "hangover" is also high. Moreover, the arrival rate for the concept "party" is low on Monday morning as is the arrival rate of the concept of "hangover." Thus, the arrival rates are time varying.

Figure 7:
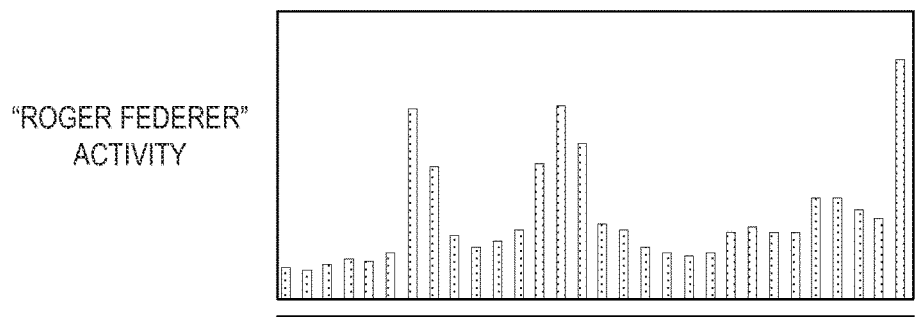
FIG. 7 depicts correlations and non-correlations of time series bar graphs of activity for example web pages.
Figure 7:
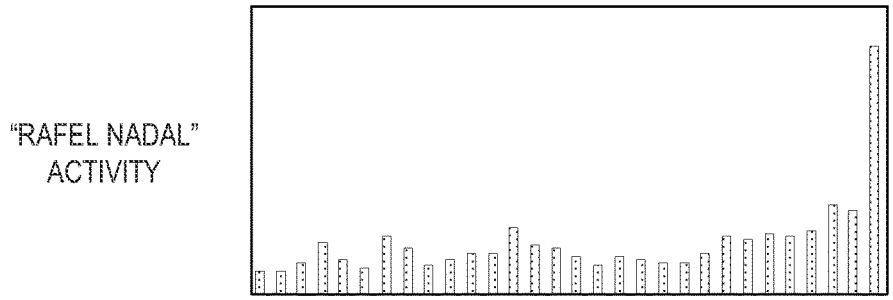
Figure 7:
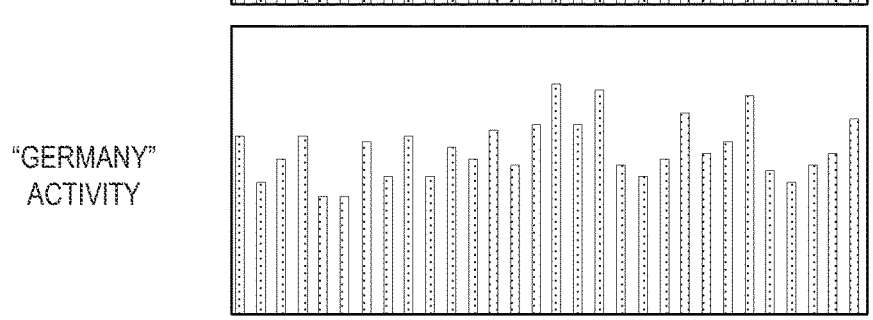

The arrival rates are not independent or happen in a vacuum. Arrival rates to the web page associated with "Roger Federer" (a professional tennis player) will be quite correlated with those of "Rafael Nadal" (a professional tennis player) yet the arrival rate to "Roger Federer" is expected to be relatively uncorrelated with those of "Germany." This is in fact what is seen as shown in FIG. 7 where the time series bar graph of activity for the web page associated with Roger Federer (top) correlates rather well with the time series bar graph of activity for the web page associated with Rafael Nadal (middle) but is uncorrelated with the activity for the web page associated with Germany (bottom).

As a zero-th order model, the arrival rates $\lambda_x(t)$ are modeled by the knowledge graph noise reduction engine 160 as nodes in a Gaussian Markov random field. For nodes X and Y, their corresponding arrival rates $\lambda_x(t)$ and $\lambda_y(t)$ will be uncorrelated/independent unless there exists an edge between the two nodes X and Y. The strength, or weight value, associated with this edge (or connection) can be measured by the Pearson correlation coefficient between the nodes X and Y as follows:

$$\rho(X,Y)=(E|\lambda_x \lambda_y|-E|\lambda_x|E|\lambda_y|)/\mathrm{sqrt}(\mathrm{var}|\lambda_X|\mathrm{sqrt}(\mathrm{var}|\lambda_Y|)) \quad (1)$$

That is, the variation in arrival rates at nodes X and Y are modeled as random variables where λx indicates the arrival rate at node X, λy indicates the arrival rate at node Y, var( . . . ) indicates the variance of a random variable, and E| . . . | indicates the expectation of a random variable. The resulting value ρ(X,Y) is the Pearson correlation coefficient between X and Y according to this statistical model.

To estimate the edge strengths, or importance weight values, for edges in the knowledge graph data structure 156, from samples of activity, e.g., page views $pv_{X,i}$ and $pv_{Y,i}$, indexed by time i, the knowledge graph engine 150 computes the empirical correlation coefficient as the strength or weight value as follows:

$$\hat{\rho}(pv_X, pv_Y) = \frac{\frac{1}{N}\sum_{i=1}^{N} pv_{X,i} \cdot pv_{Y,i} - \frac{1}{N}\sum_{i=1}^{N} pv_{X,i} \frac{1}{N}\sum_{i=1}^{N} pv_{Y,i}}{\sqrt{\frac{1}{N}\sum_{i=1}^{N} pv_{X,i}^2 - \left(\frac{1}{N}\sum_{i=1}^{N} pv_{X,i}\right)^2} \sqrt{\frac{1}{N}\sum_{i=1}^{N} pv_{Y,i}^2 - \left(\frac{1}{N}\sum_{i=1}^{N} pv_{Y,i}\right)^2}}. \quad (2)$$

This is the "sample" Pearson Correlation Coefficient. Instead of being based on a model with random variables for the arrival rates, equation (2) is an estimate of the Pearson Correlation Coefficient based on actually observed arrival rates (activity numbers) over a period of N time buckets. The values $pv_X$ and $pv_Y$ are the vectors of page views for nodes X and Y respectively, with one entry for every time bucket. The quantity $pv_{X,i}$ refers to the number of page views at node X during time bucket i, and similarly the quantity $pv_{Y,i}$ refers to the number of page views at node Y during time bucket i. Each term in this expression is an estimate of a corresponding term in the random-variable Pearson Correlation expression of equation (1) above.

As noted above, while the knowledge graph noise reduction engine 160 may identify correlations between nodes in the knowledge graph 156 and determine associated strengths or importance weights of these correlations, represented as strengths or importance weight values of the edges connecting nodes in the knowledge graph 156, the knowledge graph data structure 156 and the correlations between nodes in the knowledge graph data structure 156 are not ideal. In fact, the knowledge graph data structure 156 and the correlations will include noisy edges or connections between nodes of the knowledge graph 156. That is, the knowledge graph 156 and the determined correlations will have significant departures from the ideal situation with regard to an abundance of false correlations, as previously discussed above with regard to FIG. 6, e.g., the false correlation between activity associated with the web page for "trigonometry" and the web page for "MySQL." Moreover, the knowledge graph data structure 156 and the correlations generated based on the activity log information 152 may suffer from significant sampling noise which may cause artificially high correlations between nodes due to randomness in the sampling of the activity data leading to the activity log information 152.

A further departure from the ideal situation involves a lack of data for many of the objects in the input data 154. That is, activity for an object may be zero for large periods of time, e.g., many hours. In such situations, a lower resolution timescale must be utilized which complicates the computation of correlations and means that there will be less data with which to compute such correlations. Moreover, when activity data is relatively small for a node, the activity data tends to be very noisy and unreliable.

In addition, the input data 154 generally comprises a large number of nodes, e.g., 5 million nodes in one example implementation. Thus, to compute the correlation between every pair of nodes in the input data 154 becomes unmanageable.

The illustrative embodiments address these non-idealities by trimming the knowledge graph 156 of the input data and focusing on "popular" nodes in the knowledge graph data structure 156. That is, the knowledge graph data structure 156 is generated based on the input data 154 by the knowledge graph engine 150 and this knowledge graph data structure 156 is analyzed by the knowledge graph noise reduction engine 160, using the activity logs 152 to identify correlations between nodes in the knowledge graph 156 that are already connected by edges in the knowledge graph 156, which are indicative of correlations between popular nodes. In essence, the knowledge graph noise reduction engine 160 takes the input of the knowledge graph 156 and the activity log 152 to generate an internal "correlation graph" which is a version of the knowledge graph 156 in which correlations between connected nodes in the knowledge graph 156 are generated based on the activity log 152 and these correlations are used to identify the popular nodes in the knowledge graph 156 and popular-to-popular edges in the correlation graph. The "popular" nodes are nodes in which the activity is always strictly positive, i.e. activity does not drop below zero, within a specified period of time for the evaluation represented by the period of time covered by the activity logs 152. Edges in the knowledge graph whose correlations do not meet or exceed a predefined threshold may then be effectively removed, or filtered out, from the knowledge graph when generating the modified knowledge graph 165.

That is, the focus of the processing by the knowledge graph noise reduction engine 160 is on the popular nodes and the popular-to-popular edges, i.e. edges connecting two popular nodes. Popular-to-popular edges in the knowledge graph data structure 156 that are determined to have correlation coefficients that are equal to or below a determined threshold correlation value may be removed from the knowledge graph data structure 156 to generate a trimmed knowledge graph, or modified knowledge graph (MKG), data structure 165 that may then be used by the cognitive system 100 to perform its cognitive operations, such as question answering via the QA system pipeline 108, for example.

Popular-to-popular edges in the knowledge graph data structure 156 are focused on because they tend to provide the most impact on noise reduction in the knowledge graph and improvement in the precision of the knowledge graph based cognitive operations. This is because the largest issue with non-idealities in the knowledge graph data structure 156, as discussed above, is the existence of false positive noise in the graph, e.g., edges between nodes which in fact are not correlated. However, false edges between two obscure nodes (i.e. nodes having relatively few edges connecting them to other nodes), and false edges between popular nodes and obscure nodes, have little impact on the accuracy of the overall knowledge graph other than to slightly raise the profile of the obscure node in the knowledge graph. False edges have significant impact, however, when they exist between popular nodes since such edges may serve as bridges between sections of the knowledge graph and knowledge graph walking algorithms used to analyze such graphs, such as the Random-Walk with restarts (RWR) algorithm, are more likely to make false connections between nodes due to these false edges or noise in the knowledge graph data structure 156. By focusing on cleaning up the popular-to-popular edges in the knowledge graph data structure (or simply referred to herein sometimes as the "knowledge graph") 156, the knowledge graph noise reduction engine 160 is able to remove the false edges that are most responsible for false associations of nodes identified through knowledge graph based cognitive operations.

Other reasons for focusing on popular nodes, and more specifically the popular-to-popular edges between popular nodes, include the fact that, by virtue of the definition of what a "popular" node is, i.e. strictly positive activity during the time period of the associated activity logs 152, this implies a certain level of reliability of the data and ensures that correlations may be computed for every specified time period in a time series of activity. In general, the finer the resolution that is possible, the more accurate the correlation that is computed between nodes.

Furthermore, computing the correlations for all of the popular nodes in a knowledge graph may be unfeasible in large size knowledge graphs. For example, the input data 154 and activity logs 152 for the Wikipedia™ online encyclopedia website from January through August 2013 has been processed in one implementation of the illustrative embodiments and resulted in the identification of roughly 90,000 popular nodes. If all of the edges or links associated with these 90,000 popular nodes were to be processed, this would require processing 10s of millions of such edges or links which is not feasible given limited processing resources. By restricting the processing to the roughly 7.5 million popular-to-popular edges (or links) in the knowledge graph, the computation is effectively reduced to approximately 30-40 hours of processing time once the processing is distributed over several processors in the manner described hereafter.

To determine whether a given popular-to-popular edge in the knowledge graph is to be trimmed or not, a correlation threshold value is set by which to measure the correlation of the popular-to-popular edge. In setting this correlation threshold, the goal is to remove edges or links where there is a strong confidence that the nodes of the edge/link are uncorrelated while minimizing removal of valuable popular-to-popular edges/links. The setting of the correlation threshold is closely related to understanding two sources of noise in the knowledge graph, i.e. intrinsic noise and sampling noise. Intrinsic noise comes from the presence of alleged correlations in the knowledge graph that do not necessarily indicate a connection between the nodes. For instance, the correlation between MySQL and trigonometry exists in the knowledge graph data structure 156, as discussed above, but does not imply a correct edge/link between the nodes. Intrinsic noise generally results in unexpectedly large correlations between nodes. Unrelated nodes can look correlated but it is unusual for related nodes to look uncorrelated.

Sampling noise is more controllable due to both a finite number of samples in the data and general randomness in the sampling. An empirically observed correlation between nodes X and Y can differ from the expected value of the process generating it.

The empirical correlation between two nodes X and Y can be written as the sum of three quantities:

$$\rho(pv_X, pv_Y) = E(X, Y) + Z(\lambda_X, \lambda_Y) + S \qquad (3)$$

where $E(X,Y)$ is the intrinsic measure of edge strength (weight) between the two nodes X and Y, $Z_i > 0$ is the intrinsic noise to the correlation, and S is the random noise from sampling. To eliminate whether or not $E(X,Y)=0$, one must understand typical magnitudes for S.

One approach to measuring this sort of sampling noise in a correlation computation is referred to as a "permutation test." In addition to computing the correlation between the activity sequences, e.g., page view sequences $pvx=(pv_{X1}, pv_{X2}, \ldots, pv_{XN})$ and $pv_Y=(pv_{Y1}, pv_{Y2}, \ldots, pv_{YN})$, the correlation $\rho(pv_X, pv_Y)$ between $pv_X$ and a permuted version of the other sequence $pv_Y$ is computed. Due to the random permutation, one would expect $\rho(pv_X, pv_Y)$ to be close to zero, but because of sampling noise it will be positive. Essentially, this allows one sample from the distribution of S.

From this empirical correlation calculation, it is found that S is typically less than approximately 0.05 in magnitude. Also, is it found that $\rho(pv_X, pv_Y)$ tends to indicate a meaningful edge/link when it reaches approximately 0.2 or 0.3.

For evaluating each popular-to-popular edge whose legitimacy is to be determined by the calculation of correlation coefficients, a correlation threshold is set to determine how low the correlation must be before the two nodes of the edge are deemed unrelated. In setting the correlation threshold, the correlation threshold is set to establish a tradeoff between a tolerance for sampling noise against a willingness to discard genuine edges/links in the knowledge graph.

For example, observe that for the 90,000 popular nodes in the knowledge graph discussed previously, there are 7.5 million popular-to-popular edges/links. On average, this means that there are on the order of 100 links per popular node (e.g., web page). As a guiding principle for setting the correlation threshold, it is desirable to limit false positive dues to sampling error to less than once per node (e.g., web page). To gauge this, sets of 100 permutation tests may be performed and, for each such set of permutation tests, the maximum observed permuted correlation coefficient max $\rho_i$ is recorded.

Observing the distribution of this random variable max $\rho_i$, it is found that the maximum observed permuted correlation coefficient averages about 0.1. By setting this average of the maximum observed permuted correlation coefficient to be the correlation threshold value, the mechanisms of the illustrative embodiments effectively guarantee that on average one out of every 100 false edges/links will be falsely identified as a true edge/link. Additionally, experimentation has demonstrated that meaningful edges/links typically have correlation coefficients exceeding 0.2 or 0.3, confirming that with a threshold of approximately 0.1, there is little danger of discarding valuable popular-to-popular edges/links in the knowledge graph data structure 156.

The knowledge graph noise reduction engine 160, configured with the correlation threshold value, and having identified popular-to-popular edges in the knowledge graph data structure 156 based on the activity log information 152, the correlation calculations for the popular-to-popular edges are performed to generate the correlation coefficients for the popular-to-popular edges and compare the correlation coefficients to the correlation threshold value. For those edges that have correlation coefficients that are equal to or less than the correlation threshold, the edges are removed from the knowledge graph data structure 156 to generate the trimmed knowledge graph data structure 162. This process may utilize a parallel processing architecture that utilizes a plurality of processor cores on the same or different data processing systems across which the pre-processing of the input data 164 and access log 162 data for reconfiguring of the input data for processing, e.g., reconfiguring from a column oriented set of data to a row oriented set of data, is distributed as well as the correlation coefficient value calculations are distributed.

The resulting trimmed knowledge graph data structure 162 is output to the cognitive system 100 for use as input to the cognitive operations. For example, the trimmed knowledge graph data structure 162 is utilized by the cognitive system 100 in the same manner as it would normally be used to perform cognitive operations. For example, in a search engine based cognitive system 100, the trimmed knowledge graph data structure 162 may be used to determine relative rankings of search results. In an example in which the cognitive system 100 is a social networking website, the trimmed knowledge graph data structure 162 may be used to recommend associations between users, perform predictions based on user activity, or the like. In an example in which the cognitive system 100 is a QA system utilizing the QA system pipeline 108, the cognitive operation may be the answering of a natural language question using the trimmed knowledge graph data structure 162 which represents the correlations between web pages, electronic documents, portions of content, concepts or topics, or any other entity represented in a corpus of information that is ingested by the QA system pipeline 108.

Thus, the illustrative embodiments provide mechanisms for improving the operation of cognitive systems by eliminating noisy edges in a knowledge graph used by the cognitive system to perform its cognitive operations. The illustrative embodiments utilize activity log data to determine whether the nodes of a knowledge graph are popular nodes or not. Popular-to-popular edges are identified and processed to determine if their correlation coefficients meet a minimum level of correlation and if not, the edge is removed from the knowledge graph data structure, thereby trimming the knowledge graph data structure and eliminating the noisy edge. In one implementation, the activity log data may represent pageview of web pages on a predetermined time period basis, e.g., each hour, which may be used to determine activity or arrivals at the web page. This pageview information is then used to identify popular nodes and popular-to-popular edges which can then be processed to generate correlation coefficients that can be compared to an established correlation threshold value to determine whether to retain or discard the edge from the knowledge graph data structure.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, an ingestion engine 390 is provided whose purpose it is to ingest the corpus/corpora 345, 347 of documents and, among other things, provide a knowledge graph data structure that may be used to apply the queries generated by the QA system pipeline 300 and generate candidate answers and/or evaluate evidence in support of one or more candidate answers to generate confidence scores. The ingestion engine 390 comprises a knowledge graph engine 392 which processes the corpus/corpora 345, 347 data to generate a knowledge graph 394. The corpus/corpora 345, 347 data may be the input data and may further comprise activity log data 396 that can be used to identify popular nodes in the knowledge graph 394 and popular-to-popular edges in the knowledge graph 394. The ingestion engine 390 further comprises the knowledge graph noise reduction engine 398 which operates in the manner described previously to trim or modify the knowledge graph 394 and output a trimmed knowledge graph, or modified knowledge graph (MKG), data structure 399 to the QA system pipeline 300 for use in performing its question answering operation.

Figure 4:
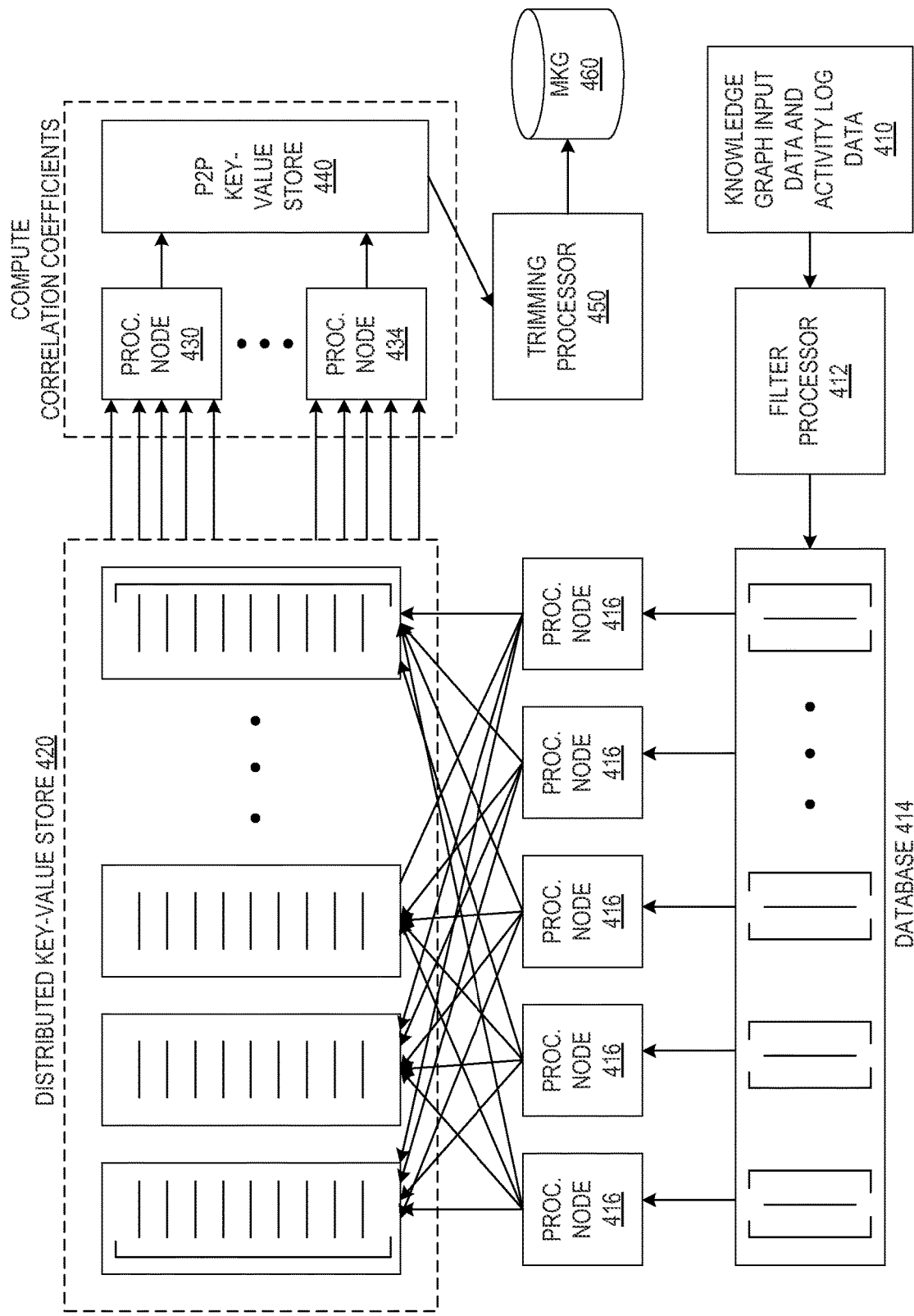
FIG. 4 is an example block diagram illustrating a distribute parallel processing architecture for facilitating correlation coefficient calculations in accordance with one illustrative embodiment.

As noted above, in order to perform the correlation coefficient calculations, the calculations are distributed over a plurality of processing cores and/or systems due to the relatively large size of the input data and activity log information that needs to be processed. FIG. 4 is an example block diagram illustrating a distributed parallel processing architecture for facilitating correlation coefficient calculations in accordance with one illustrative embodiment. The distributed parallel processing architecture shown in FIG. 4 may be used, for example, to facilitate the operations of the knowledge graph noise reduction engine 398 in FIG. 3, for example, so as to generate the trimmed, or modified, knowledge graph data structure 399 for output to the QA system pipeline 300.

As shown in FIG. 4, the architecture receives a set of knowledge graph input data 410 comprising, for each node, a time series of activity data which is provided into a filter processor 412 that may perform various types of filtration and pre-processing of raw activity data, and which outputs a database or data store that stores the processed activity log data for the various nodes of the knowledge graph in a column format 414. A plurality of processor nodes 416 each process a column, or set of columns, from the column formatted database or data store 414 to reformat the data into a row format in a distributed key-value store 420, such as an in-memory database, e.g., a Redis key-value store where multiple Redis servers are utilized to process the key-value data. In this distributed key-value store 420, the keys are the popular nodes in the knowledge graph, and the values are chunks of the time series of activity data, stored as a string of values. To pull the time series for a given popular node from the distribute key-value store 420, a service is provided to query each server, e.g., Redis server, for the key and reconstruct the time series from the corresponding chunks obtained from the servers.

For example, in one illustrative embodiment, to compute correlations between nodes X and Y, representing web pages of a website, the mechanisms of the illustrative embodiments utilize each node's pageview time series. That is, the mechanisms of this illustrative embodiment uses an index/key-value-store that maps from node name to a time series which is provided as a "row representation." Unfortunately, live data is usually presented in column-formatting, where each time index yields a vector containing the pageview counts for every node at that time index. Thus, the mechanisms of the illustrative embodiments re-indexed the data in a row format (alternatively, transposed) for more efficient accessing.

Computation of the correlation coefficients is distributed over a plurality of processing nodes 430-434 as well. That is, the popular-to-popular edges/links are split between the set of processing nodes 430-434 and each uploads the correlation coefficients it computes to another key-value store 440. The keys of this store 440 are the tuple of popular nodes for the particular popular-to-popular (P2P) edges/links, e.g., <popular node 1, popular node 2>, and the values are the correlation coefficients calculated for the two time series of activity logs for the two popular nodes. The key-value storage 440 may then be processed by the trimming processor 450 to determine a listing of popular-to-popular edges/links to be removed from the knowledge graph and actually remove these edges/links from the knowledge graph input data to thereby generate a trimmed knowledge graph, or modified knowledge graph (MKG), 460 that is output for use by a cognitive system (not shown).

Figure 5:
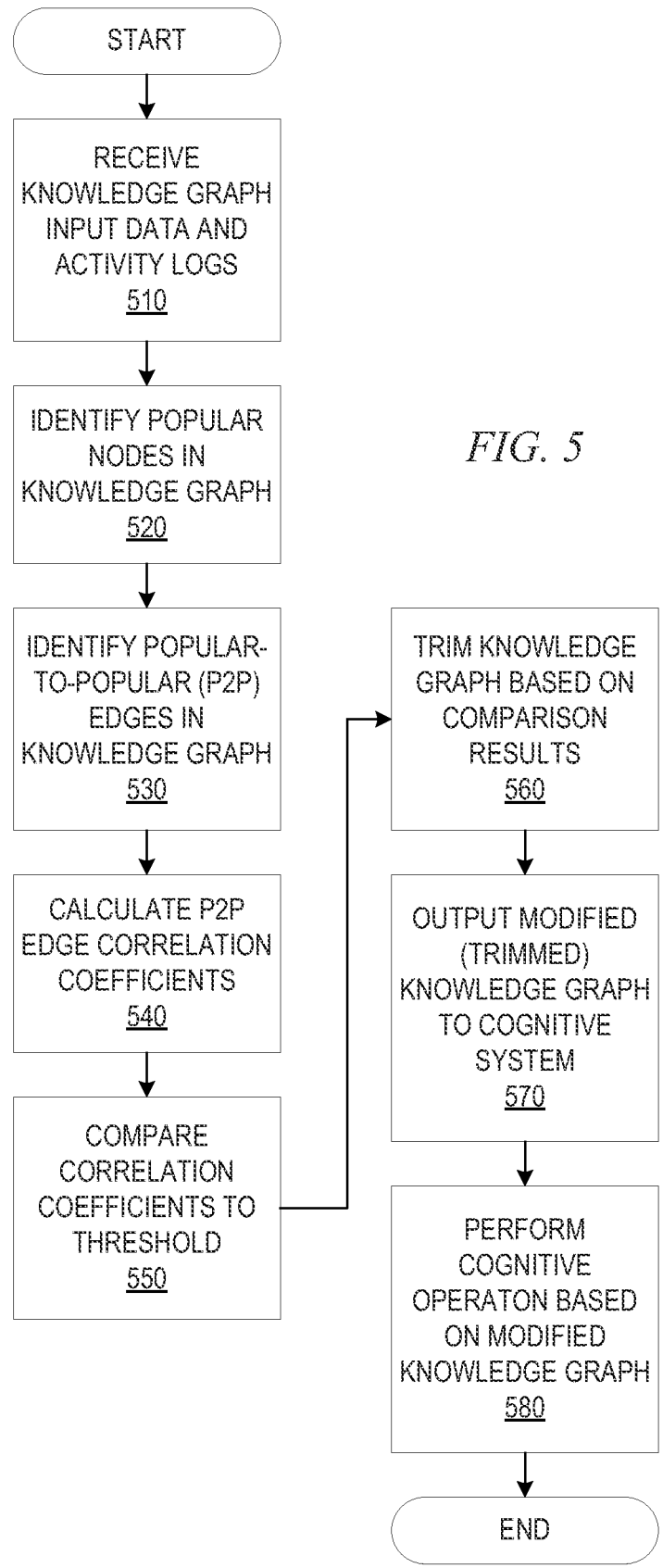
FIG. 5 is a flowchart outlining an example operation of a knowledge graph nose reduction engine in accordance with one illustrative embodiment.

FIG. 5 is a flowchart outlining an example operation of a knowledge graph noise reduction engine in accordance with one illustrative embodiment. As shown in FIG. 5, the operation starts with receiving knowledge graph input data comprising a original knowledge graph and corresponding activity log data for the nodes of the knowledge graph (step 510). Based on the activity log data for the knowledge graph nodes, popular nodes in the knowledge graph are identified (step 520). For each popular node, edges to other popular nodes in the knowledge graph are identified (step 530). For each popular-to-popular edge identified in the knowledge graph, a correlation coefficient is calculated for the popular-to-popular edge (step 540). The correlation coefficients are compared to a correlation threshold (step 550) and popular-to-popular edges that have correlation coefficients which have a predetermined relationship to the correlation threshold are removed from the original knowledge graph, e.g., edges having correlation coefficients equal to or lower than the correlation threshold are removed (step 560). The resulting modified knowledge graph is output to a cognitive system (step 570) which then performs a cognitive operation based on the modified knowledge graph (step 580). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for performing a cognitive operation, the method comprising:

receiving, by the data processing system, an original graph data structure comprising nodes and edges between nodes;

receiving, by the data processing system, activity log information for nodes of the original graph data structure, wherein an activity metric associated with a node, in the activity log information, represents activities performed with regard to the object itself that is represented by the node;

identifying, by the data processing system, a set of nodes in the original graph data structure having a predetermined pattern of activity in the activity log information, and identifying a set of edges between these nodes;

evaluating the predetermined patterns of activity associated with the nodes in the set of nodes to identify correlations between activity of first nodes in the set of nodes with activity of other second nodes in the set of nodes;

calculating, by the data processing system, an importance weight for each edge in the set of edges based on results of evaluating the predetermined patterns of activity to identify correlations between activity of the first nodes in the set of nodes with other second nodes in the set of nodes;

modifying, by the data processing system, the original graph data structure based on the calculated importance weights for the edges in the set of edges at least by comparing the calculated importance weights for the edges to at least one noise criterion, to thereby generate a modified graph data structure; and performing, by the data processing system, a cognitive operation based on the modified graph data structure, wherein the set of edges comprises at least one of actual edges between the nodes and potential edges between the nodes, wherein modifying the original graph data structure to generate the modified graph data structure comprises removing one or more of the edges in the set of edges from the original graph data structure, where the removed edge is determined to be noise in the original graph data structure based on the at least one noise criterion.

2. The method of claim 1, wherein the subset of nodes of the graph are nodes determined to be associated with one or more popular nodes identified by the predetermined pattern of activity, wherein a node is a popular node when an activity metric of the node exceeds a threshold level of activity repeatedly within a predetermined period of time.

3. The method of claim 2, wherein the identified set of edges are popular-to-popular edges that connect a first popular node to a second popular node.

4. The method of claim 3, further comprising calculating, for each popular-to-popular edge in the set of edges, a correlation metric that correlates an activity pattern in the activity log information for the first popular node with an activity pattern in the activity log information for the second popular node of the popular-to-popular edge, and wherein modifying the original graph data structure based on the calculated importance weights for the edges in the set of edges comprises modifying the original graph data structure based on the calculated correlation metrics of each of the popular-to-popular edges in the set of edges.

5. The method of claim 4, wherein modifying the original graph data structure based on the calculated correlation metrics of each of the popular-to-popular edges in the set of edges comprises, for each of the popular-to-popular edges;

determining if a correlation metric for the popular-to-popular edge satisfies a predetermined relationship with a predetermined correlation threshold value; and in response to determining that the correlation metric for the popular-to-popular edge does not satisfy the predetermined relationship, removing the popular-to-popular edge from the original graph data structure when generating the modified graph data structure based on the original graph data structure.

6. The method of claim 1, wherein the at least one noise criterion comprises a predetermined correlation threshold value, and wherein modifying the original graph data structure based on the calculated importance weights for the edges in the set of edges comprises:

calculating, for each edge in the set of edges, a correlation metric that correlates activity information for the nodes connected by the edge, based on the importance weight associated with the edge;

determining, for each edge in the set of edges, whether a corresponding correlation metric of the edge satisfies a predetermined relationship with a predetermined correlation threshold value; and in response to determining that the correlation metric for the edge does not satisfy the predetermined relationship, removing the edge from the original graph data structure when modifying the original graph data structure to generate the modified graph data structure.

7. The method of claim 1, wherein the cognitive operation is at least one of a natural language question answering operation utilizing the modified graph data structure to identify related concepts in a corpus of information, or an information retrieval operation that retrieves information and ranks the retrieved information based on the modified graph data structure.

8. The method of claim 1, wherein the data processing system implements a parallel architecture having a plurality of processors, and wherein calculating the importance weight for each edge in the set of edges comprises distributing the calculations across the plurality of processors, and wherein modifying the original graph data structure comprises inputting, to a trimming processor in the data processing system, the importance weights calculated by the plurality of processors and modifying the original graph data structure to generate the modified graph data structure by removing edges in the set of edges from the original graph data structure that have importance weights that are below a predetermined threshold value.

9. The method of claim 1, wherein the nodes represent web pages of one or more web sites, and wherein the activity log information stores information regarding a number of page views of one or more web pages represented by the nodes.

10. A computer program product comprising a computer readable storage medium having a computer readable program stored therein, wherein the computer readable program, when executed on a data processing system, causes the data processing system to:

receive an original graph data structure comprising nodes and edges between nodes;

receive activity log information for nodes of the original graph data structure, wherein an activity metric associated with a node, in the activity log information, represents activities performed with regard to the object itself that is represented by the node;

identify, by the data processing system, a set of nodes in the original graph data structure having a predetermined pattern of activity in the activity log information, and identify a set of edges between these nodes;

evaluate the predetermined patterns of activity associated with the nodes in the set of nodes to identify correlations between activity of first nodes in the set of nodes with activity of other second nodes in the set of nodes;

calculate an importance weight for each edge in the set of edges based on results of evaluating the predetermined patterns of activity to identify correlations between activity of the first nodes in the set of nodes with other second nodes in the set of nodes;

modify the original graph data structure based on the calculated importance weights for the edges in the set of edges at least by comparing the calculated importance weights for the edges to at least one noise criterion, to thereby generate a modified graph data structure; and perform a cognitive operation based on the modified graph data structure, wherein the set of edges comprises at least one of actual edges between the nodes and potential edges between the nodes, wherein modifying the original graph data structure to generate the modified graph data structure comprises removing one or more of the edges in the set of edges from the original graph data structure, where the removed edge is determined to be noise in the original graph data structure based on the at least one noise criterion.

11. The computer program product of claim 10, wherein the subset of nodes of the graph are nodes determined to be associated with one or more popular nodes identified by the predetermined pattern of activity, wherein a node is a popular node when an activity metric of the node exceeds a threshold level of activity repeatedly within a predetermined period of time.

12. The computer program product of claim 11, wherein the identified set of edges are popular-to-popular edges that connect a first popular node to a second popular node.

13. The computer program product of claim 12, wherein the computer readable program further causes the data processing system to calculate, for each popular-to-popular edge in the set of edges, a correlation metric that correlates an activity pattern in the activity log information for the first popular node with an activity pattern in the activity log information for the second popular node of the popular-to-popular edge, and wherein the computer readable program further causes the data processing system to modify the original graph data structure based on the calculated importance weights for the edges in the set of edges at least by modifying the original graph data structure based on the calculated correlation metrics of each of the popular-to-popular edges in the set of edges.

14. The computer program product of claim 13, wherein the computer readable program further causes the data processing system to modify the original graph data structure based on the calculated correlation metrics of each of the popular-to-popular edges in the set of edges at least by, for each of the popular-to-popular edges:

determining if a correlation metric for the popular-to-popular edge satisfies a predetermined relationship with a predetermined correlation threshold value; and in response to determining that the correlation metric for the popular-to-popular edge does not satisfy the predetermined relationship, removing the popular-to-popular edge from the original graph data structure when generating the modified graph data structure based on the original graph data structure.

15. The computer program product of claim 10, wherein the at least one noise criterion comprises a predetermined correlation threshold value, and wherein the computer readable program further causes the data processing system to modify the original graph data structure based on the calculated importance weights for the edges in the set of edges at least by:
   calculating, for each edge in the set of edges, a correlation metric that correlates activity information for the nodes connected by the edge, based on the importance weight associated with the edge;
   determining, for each edge in the set of edges, whether a corresponding correlation metric of the edge satisfies a predetermined relationship with a predetermined correlation threshold value; and
   in response to determining that the correlation metric for the edge does not satisfy the predetermined relationship, removing the edge from the original graph data structure when modifying the original graph data structure to generate the modified graph data structure.

16. The computer program product of claim 10, wherein the cognitive operation is at least one of a natural language question answering operation utilizing the modified graph data structure to identify related concepts in a corpus of information, or an information retrieval operation that retrieves information and ranks the retrieved information based on the modified graph data structure.

17. The computer program product of claim 10, wherein the nodes represent web pages of one or more web sites, and wherein the activity log information stores information regarding a number of page views of one or more web pages represented by the nodes.

18. An apparatus comprising:
   one or more processors; and
   a memory coupled to the one or more processors, wherein the memory comprises instructions which, when executed by the one or more processors, cause the one or more processors to:
      receive an original graph data structure comprising nodes and edges between nodes;
      receive activity log information for nodes of the original graph data structure, wherein an activity metric associated with a node, in the activity log information, represents activities performed with regard to the object itself that is represented by the node;
      identify, by the data processing system, a set of nodes in the original graph data structure having a predetermined pattern of activity in the activity log information, and identify a set of edges between these nodes;
      evaluate the predetermined patterns of activity associated with the nodes in the set of nodes to identify correlations between activity of first nodes in the set of nodes with activity of other second nodes in the set of nodes;
      calculate an importance weight for each edge in the set of edges based on results of evaluating the predetermined patterns of activity to identify correlations between activity of the first nodes in the set of nodes with other second nodes in the set of nodes;
      modify the original graph data structure based on the calculated importance weights for the edges in the set of edges at least by comparing the calculated importance weights for the edges to at least one noise criterion, to thereby generate a modified graph data structure; and
      perform a cognitive operation based on the modified graph data structure, wherein the set of edges comprises at least one of actual edges between the nodes and potential edges between the nodes, wherein modifying the original graph data structure to generate the modified graph data structure comprises removing one or more of the edges in the set of edges from the original graph data structure, where the removed edge is determined to be noise in the original graph data structure based on the at least one noise criterion.

* * * * *